United States Patent [19]

Yoshida et al.

[11] 4,085,942
[45] Apr. 25, 1978

[54] PACKING FOR USE IN STEEL-PIPE HYDRAULIC TESTING APPARATUS

[75] Inventors: Mitsuo Yoshida, Osaka; Wataru Furukawa; Takashi Yamaguchi, both of Wakayama; Kazuo Sasaki, Minoo, all of Japan

[73] Assignees: Sumitomo Kinzoku Kogyo Kabushiki Kaisha, Osaka; Kabushiki Kaisha Yamamoto Suiatsu Kogyosho, Toyonaka; Nihon Valqua Kogyo Kabushiki Kaisha, Tokyo, all of Japan

[21] Appl. No.: 724,057

[22] Filed: Sep. 16, 1976

[30] Foreign Application Priority Data

Oct. 6, 1975 Japan .................. 50-120500

[51] Int. Cl.² ............................................. F16J 15/16
[52] U.S. Cl. ..................................... 277/30; 277/136; 277/188 R; 277/227
[58] Field of Search ............. 277/188 R, 148, 45, 277/227, 30, 137

[56] References Cited

U.S. PATENT DOCUMENTS

| | | | |
|---|---|---|---|
| 1,331,360 | 2/1920 | Parsons et al. | 277/148 |
| 3,356,377 | 12/1967 | Voitek | 277/137 |
| 3,464,708 | 9/1969 | Hamilton | 277/137 |
| 3,970,321 | 7/1976 | Dechavanne | 277/227 |

*Primary Examiner*—Richard E. Aegerter
*Assistant Examiner*—L. Footland

[57] ABSTRACT

A packing for use in a steel-pipe hydraulic testing apparatus, consisting of: an annular body having an annular cut in its inner peripheral portion; a plurality of backing pieces fastened to the wall of the annular cut at a given circumferential spacing and directed in the radial direction; and a plurality of adapter pieces embedded in the inner peripheral walls of the annular body of the packing at a given circumferential spacing and exposed to the annular cut, so that the aforesaid plurality of backing pieces may be each slidable on the surfaces of a pair of adjoining adapter pieces. This packing is contracted due to a hydraulic pressure being applied to the outer periphery of the body of the packing, and as a result the respective adapter pieces will slide on the surfaces of the adapter pieces in the circumferential direction of the packing.

1 Claim, 8 Drawing Figures

PACKING FOR USE IN STEEL-PIPE HYDRAULIC TESTING APPARATUS

BACKGROUND OF THE INVENTION

1. Field of the Invention

This invention relates to a packing for use in a steel-pipe hydraulic testing apparatus, and more particularly to a packing for use in such a portion of the testing apparatus, which requires to maintain water-tightness of the pipe.

2. Description of the Prior Art

It has been a common practice that steel pipes such as casing pipes and the like are subjected to thread-cutting at their opposite ends and then to the subsequent hydraulic test, followed by storage. In this connection, the threaded opposite ends of a pipe are protected by using protectors or caps which are fitted on the aforesaid threaded ends of the pipe. Hitherto, upon hydraulic test, one end of a pipe is fitted in the head stock-head of a hydraulic testing apparatus, with the aforesaid protector or cap fitted on one threaded end of the pipe, while the other end of the pipe is fitted in the tail stock-head of the testing apparatus, with a protector or a cap removed from the other threaded end of the pipe. In this manner, the steel pipe is fixed in the hydraulic testing apparatus. Then, a pilot hydraulic pressure is applied to the outer periphery of an annular packing, which is located around the root portion of the threaded end of the pipe, so that the packing will be compressed radially, thereby bringing the inner peripheral surface of the packing in intimate contact with the outer periphery of the pipe. Then, the hydraulic pressure is applied to the interior or the inner surface of the pipe for intended testing.

However, the prior art testing apparatus suffers from shortcoming in that, upon testing, a protector or cap fitted on the other end of a pipe, which in turn is to be fitted in the tail stock-head of the testing apparatus, should be removed and hence many man hours are required for removal of the protector, so that the operational efficiency of the hydraulic test is remarkably lowered. For this reason, it has been desired to provide a testing apparatus which permits the testing of a steel pipe, without removing the protector or cap therefrom.

In this respect, there arises a problem that when a protector or cap is fitted on the end of a pipe, the outer diameter of the pipe is becomes too large to insert the aforesaid end of the pipe into the prior art packing. If there is provided a packing which permits the insertion of such an end of the pipe, there necessarily arises an increase in the clearance between the outer periphery of the pipe and the inner peripheral surface of the packing. This brings about accompanying problems. In other words, a pressure is applied to the inner peripheral surface of the packing along the length of the pipe towards its center portion, upon application of a hydraulic test pressure, so that such a portion of the packing which contacts a steel pipe will creep or yield towards the center portion of the packing, thereby causing leakage of pressure water or breakage of the packing.

This is particularly true with the case where there is a considerable degree of clearance between the packing and the pipe. In addition, in the event of the failure or breakage of the packing, considerably many hours are required for replacement of the packing, with resulting lowered operational efficiency.

The aforesaid shortcomings or problems largely affect not only the efficiency of hydraulic test but also the accuracy of hydraulic test itself.

SUMMARY OF THE INVENTION

It is accordingly a principal object of the present invention to provide a packing for use in a hydraulic testing apparatus, in which there are provided a plurality of backing pieces which may move towards the center of a packing, following the contracting movement of the packing towards its center, in an attempt to resist the pressure being applied to the inner peripheral portion of the packing in the axial direction of the pipes, so that such a portion of the testing apparatus, which requires water-tightness for a pipe, may be reinforced with the backing pieces, thereby providing complete high-pressure sealing as well as permitting a test without removing a protector or a cap from the pipe being tested.

It is another object of the present invention to provide a packing of the type described, in which there are provided a plurality of adapter pieces in a manner that each backing piece spans the adjoining paired adapter pieces, so that, upon contraction of the packing, there may be achieved smooth movement of the backing pieces on the adapter pieces in the circumferential direction of the packing, and the body of the packing may be positively reinforced with the aforesaid adapter pieces.

It is a further object of the present invention to provide a packing of the type described, in which the aforesaid backing pieces may each slide on the surfaces of the adjoining adapter pieces so as to uniformly resist the pressure being applied to the inner peripheral portion of the packing in the axial direction of the packing, upon application of the testing hydraulic pressure.

It is a still further object of the present invention to provide a packing of the type described, in which the aforesaid backing pieces are fastened to the body of the packing by means of elastic pins which provide strengths high enough to resist the shearing stress arising in the body of the packing upon its contraction, so that the backing pieces may be prevented from coming off the packing due to the rupture of the rigid pins, if so used, and in addition the service life of the packing may be extended.

It is a yet further object of the present invention to provide a packing of the type described, in which there is provided a tapered portion for the inner peripheral portion of the body of the packing, so that, when the body of the packing is brought into intimate contact with a steel pipe being tested, the inner peripheral portion of the packing may be further intimately pressed against the outer periphery of the pipe due to a hydraulic pressure, thereby providing further improved water-tightness for the pipe.

It is a further object of the present invention to provide a packing of the type described, in which there are provided sheath tubes which surround the peripheries of the aforesaid elastic pins, so that upon contraction of the body of a packing, the elastic pins embedded in the packing body may be prevented from their bitting the body of the packing, thereby preventing the rupture or failure of the packing.

It is a further object of the present invention to provide a packing of the type described, in which there is provided an outer peripheral groove for the body of the packing, so that a pilot hydraulic pressure may be uniformly but positively applied to the outer periphery of the body of a packing so as to cause the radial contraction of the packing.

According to the present invention, the aforesaid objects and features of the invention may be readily attained in a packing for use in a steel-pipe hydraulic testing apparatus, which comprises: an annular body having an annular cut in its inner peripheral portion; a plurality of backing pieces fastened to the wall of the annular cut at a given circumferential spacing in the radial direction; and a plurality of adapter pieces embedded in the inner peripheral walls of the annular body of the packing at a given circumferential spacing, while the aforesaid plurality of backing pieces are each slidable on the exposed surfaces of a pair of adjoining adapter pieces, when the contraction of the aforesaid packing is under way.

DESCRIPTION OF THE PREFERRED EMBODIMENTS

Figure 1:
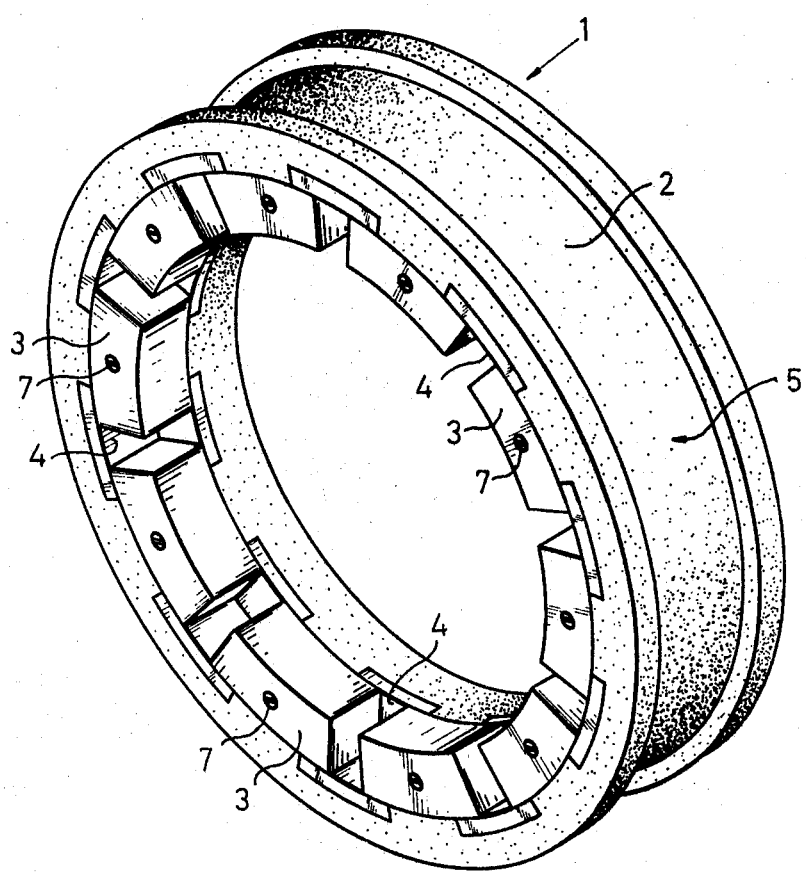
FIG. 1 is a perspective view of a packing according to the present invention.
Figure 2:
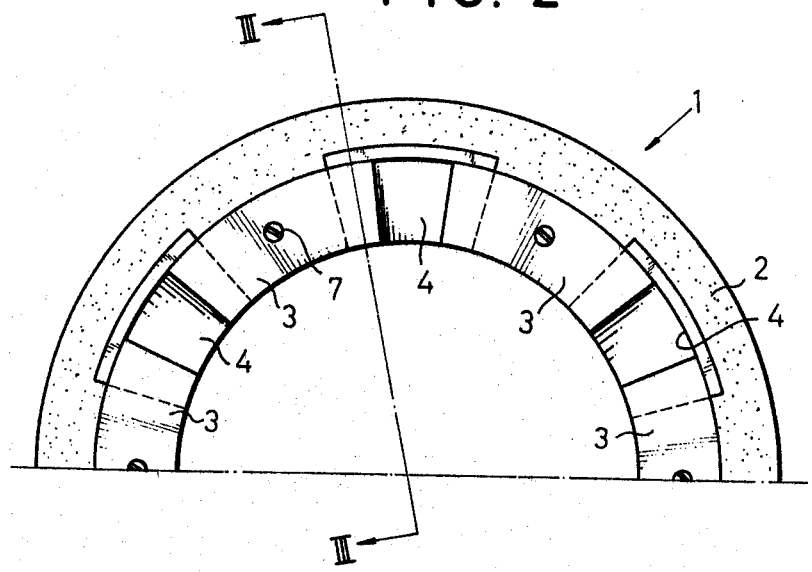
FIG. 2 is a partial front view of the packing.
Figure 3:
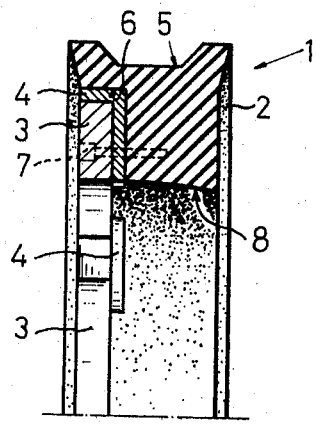
FIG. 3 is a cross-sectional view taken along the line III—III of FIG. 2.
Figure 4:
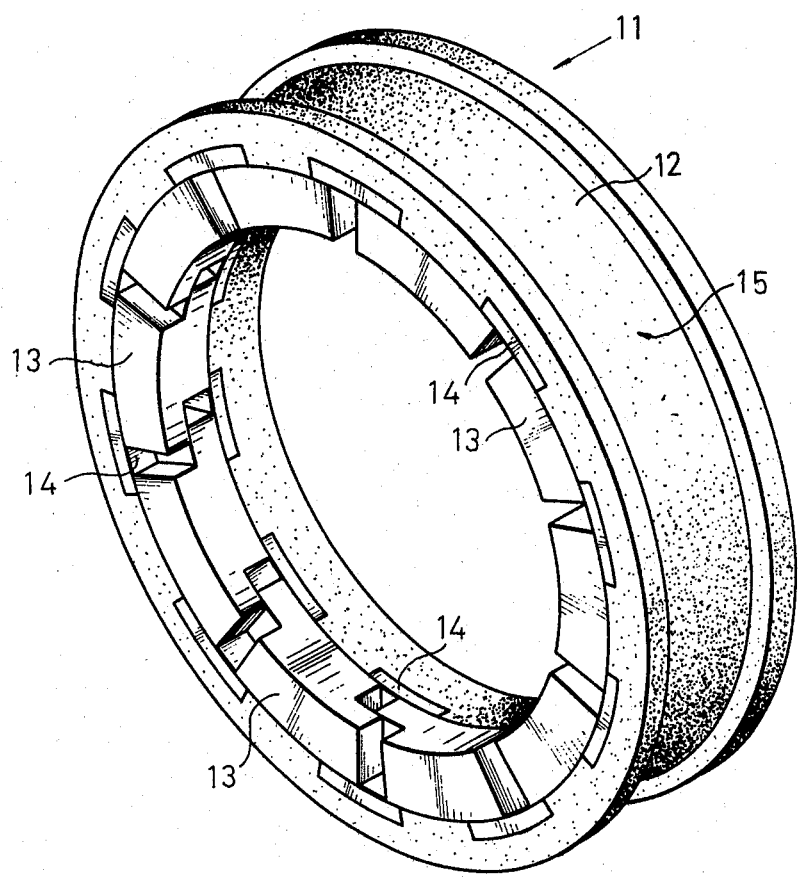
FIG. 4 is a perspective view of another embodiment of the packing according to the present invention.
Figure 5:
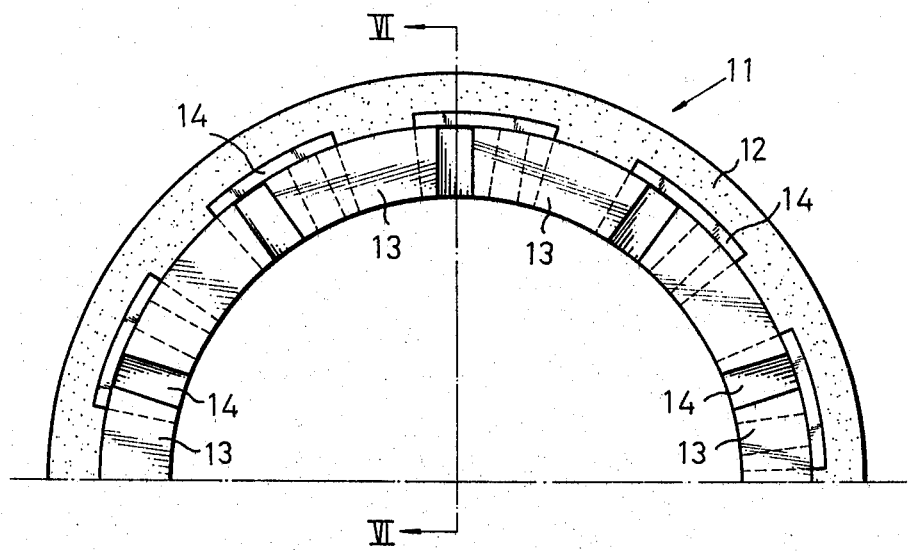
FIG. 5 is a partial front view of the packing of FIG. 4.
Figure 6:
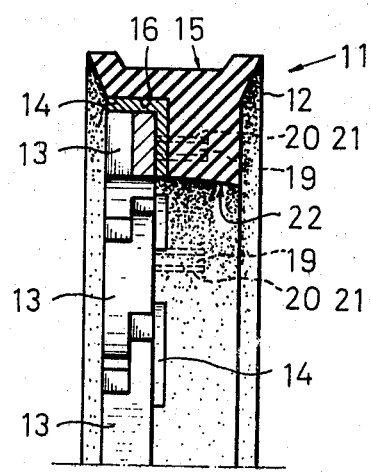
FIG. 6 is a cross-sectional view taken along the line IV—IV of FIG. 5.

Referring now to FIGS. 1 to 3, there is shown a packing at 1, which consists of a packing body 2, a plurality of backing pieces 3 and a plurality of adapter pieces 4.

The packing body 2 of an annular shape is made of polyurethane rubber and the like, which have sufficient resiliency, and the packing body 2 is provided with a circumferential groove 5 in its outer periphery for uniformly receiving a pilot hydraulic pressure. In addition, the packing body 2 is provided with an annular cut 6 along its inner periphery, while a plurality of backing pieces 3 made of a hard material such as an aluminum alloy are placed in the aforesaid cut at a given circumferential spacing and directed in the radial direction. The backing pieces 3 are fastened to the wall of the aforesaid cut 6 by means of screws 7. In addition, adapter pieces 4 of a 'L' shaped cross-section, which are made of a hard material such as an aluminum alloy, are embedded in the walls of the annular cut 6, with the inner surfaces of the adapter pieces exposed to the cut 6. Thus, the outer peripheral surface of one backing piece 3 slidingly contacts the aforesaid exposed surfaces of the adjoining paired adapter pieces 4 on the opposite sides of the backing piece 3. That portion of the inner peripheral portion of the packing body 2, which excludes the annular cut 6, is tapered in a manner to decrease the inner diameter thereof from the side of the backing pieces 3 and adapter pieces 4 towards the side of the packing, on which the hydraulic pressure acts in the axial direction. The aforesaid tapered portion is referred to at 8.

FIGS. 4 to 7 show another embodiment of the packing according to the present invention. Like the packing shown in FIGS. 1 to 3, the packing 11 consists of a packing body 12, a plurality of backing pieces 13 and a plurality of adater pieces 14.

The packing body 12 of a ring shape is made of polyurethane rubber and the like which have sufficient resiliency, and the body 12 is provided with an outer peripheral groove 15 in its outer periphery for uniformly receiving a pilot hydraulic pressure thereon. In addition, the packing body 12 is provided with an annular cut 16 along its inner periphery, while a plurality of backing pieces 13 are placed in the aforesaid annular cut 16 at a given circumferential spacing, and directed in a manner that the edges of the adjoining backing pieces 13 may overlap one another in the circumferential direction.

Figure 7:
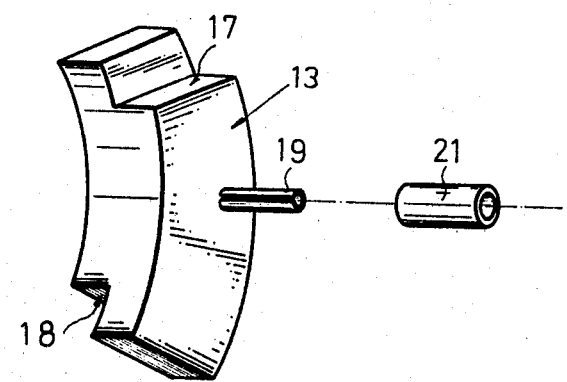
FIG. 7 is a perspective view of a backing piece as used in the packing of FIG. 4.

As shown in FIG. 7, the backing piece 13 is formed into an arcuate shape and made of a hard material such as an aluminum alloy. In addition, the backing piece 13 has two cuts 17, 18 on its diagonally-opposing paired corners in one direction, and thus the adjoining edges of the adjoining backing pieces 13 are formed in a complementary relation to one another, i.e., the edges of the adjoining backing pieces 13 may overlap in their circumferential direction. Upright on that side surface of the backing piece 13, which contacts the inner side wall of the cut 16 as viewed in the axial direction are elastic pins 19. On the other hand, provided in the aforesaid inner side wall of the annular cut 16 are attaching holes 20 which are to receive the aforesaid elastic pins 19 therein. In this respect, sheaths 21 made of a hard material such as a metal are inserted in the aforesaid attaching holes to protect the inner walls of the attaching holes from the injury due to elastic pins 19. Thus, the respective backing pieces 13 are attached in the annular cut 16 in the packing body 12 by means of the aforesaid elastic pins 19, respectively.

Still furthermore, embedded in those walls of the cut 16 in the packing body 12, which contact the backing pieces 13, are adapter pieces 14 having a 'L' shaped cross-section, with their inner surfaces exposed to the cut 16. The adapter pieces 13 are made of a hard material such as an aluminum alloy, and as a result the surfaces of the backing pieces 13 slidingly contact the aforesaid exposed inner surfaces of the adapter pieces 14.

Yet furthermore, that portion of the inner peripheral surface of the packing body 12, which excludes the annular cut 16, is tapered in a manner to decrease the inner diameter thereof from the side of the backing pieces 13 and adapter pieces 14 towards the side, on which the hydralic pressure acts. The aforesaid tapered portion is referred to at 22.

The packings 1 and 11 having the aforesaid constructions are attached in the tail stock-head of the hydraulic testing apparatus. The operation of the testing apparatus will be described in detail with reference to the packing 1 shown in FIGS. 1 to 3, hereunder.

Figure 8:
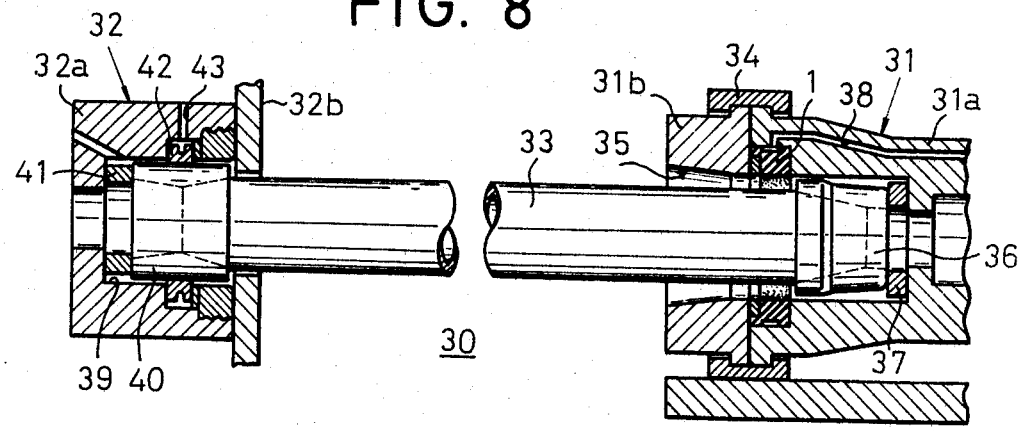
FIG. 8 is a view of an outline of a hydraulic testing apparatus incorporating a packing of the present invention.

As shown in FIG. 8, a hydraulic testing apparatus 30 is provided with a tail stock-head 31 and a head stock-head 32 which faces the aforesaid tail stock-head 31. Thus, the opposite ends of a pipe 33 are fitted in the aforesaid heads 31, 32, respectively.

The tail stock-head 31 consists of a tail stock-head body 31a, and a locking body 31b, and the bodies 31a and 31b are coupled together by means of a coupling ring 34. Defined in the tail stock-head 31 is an inserting hole 35, through which the pipe 33 having protector 36 on its one end is inserted and secured in position by the medium of a cushion 37 to the bottom of the hole 35, with the packing 1 attached to the inner surface of the head body 31a along the boundary line between the stock body 31a and the locking body 31b. On the other hand, a water-introducing passage 38 extends through the locking body 31b into the outer peripheral portion of the packing body 2 for introducing a hydraulic pressure therethrough.

The head stock-head 32 consists of a head-stock-body 32a and a locking body 32b, while an inserting hole 39 is defined in the head body 32a. Thus, the other end of the pipe 33 having a cup ring 40 thereon is fitted in the aforesaid hole 39, with a cushion 41 interposed between the tip of the pipe and the bottom of the hole 39. The packing 42 is installed on that inner peripheral surface of the head body 32, which faces the inner periphery of the cup ring 40, while a water-introducing passage 43 is defined in the head body 32a and extends into the outer periphery of the packing 42 for introducing a pilot hydraulic-pressure therethrough. The locking body 32b is fitted in the entrance of the inserting hole 39 in a manner to sandwich the packing 42 with the wall of the inserting hole 39.

Upon testing, pressure water is supplied through the water-introducing passage 38 so as to compress the packing body 2 in its radial direction. This causes the contraction of the packing body 2, whereupon the respective backing pieces 3 move towards the center of the packing body 2, while sliding on the surfaces of the adapter pieces 4 in a manner to reduce a gap defined between the adjoining backing pieces 3, so that the inner peripheral surface of the packing body 2 will be urged against the outer peripheral surface of the pipe 33 in sealing relation.

Under such a condition, a hydraulic pressure is applied to the inner surface of the pipe 33 for the intended hydraulic test. In this respect, even if the pressure in the axial direction is applied to the inner surface of the packing body 2 due to testing high-pressure water, the inner peripheral portion of the packing may be supported by means of the backing pieces 3, so that such a portion of the inner peripheral surface of the packing body 2, which contacts the outer periphery of the pipe 33, will not yield nor creep towards the center portion of the pipe 33 but urged against the outer periphery of the pipe positively. As a result, even if there is a considerable degree of clearance between the inner peripheral surface of the packing body 2 and the outer periphery of the pipe 33, prior to contraction of the packing body 2, such a clearance may be completely eliminated, providing a complete sealing for the pipe. This prevents water leakage therethrough.

On the other hand, as has been described, the adapter pieces 4 are embedded in the walls of the annular cut 6 in the packing body 2 in a manner that one backing piece 3 contacts the adjoining paired adapter pieces, so that the edges of the adjoining backing pieces 3 may be supported by the adapter pieces 4, with the clearance left there-between. Accordingly, the failure or rupture of the packing body 2 due to a stress acting on the aforesaid edges of the adjoining backing pieces 3 may be prevented.

Description will now be turned to the function of the packing 11 shown in FIGS. 4 to 7. The packing 11 is installed in the testing apparatus 30 in the same manner as the packing 1, and serves to seal the outer peripheral surface of the steel pipe 33 by contracting therearound. Upon contraction of the packing body 12, the cut edges of the adjoining backing pieces 13 overlap each other in the axial direction, while the respective backing pieces 13 slide on the surfaces of the adjoining adapter pieces 14 in the circumferential direction.

Under such a condition, a hydraulic pressure is applied to the inner surface of the steel pipe 33 for a hydraulic test. In this case, even if a pressure caused by the testing high-pressure water is applied to the inner surface of the packing body 12 in the axial direction, the inner peripheral portion of the packing is supported by the backing pieces 13, in a manner that the packing body 12 may uniformly resist the pressure in the axial direction, because the backing pieces 13 are continuously provided therein, with the opposite edges of each backing pieces being overlapped in the axial direction. Thus, such a portion of the packing body 12 which contacts the outer periphery of the steel pipe 33 will not creep or yield towards the center portion of the pipe, insuring positive sealing for a steel pipe.

Meanwhile, one modification of the packing according to the present invention will be described hereunder, although this is not shown herein.

In other words, there is provided an annular groove along the central, inner periphery of the packing body, while a plurality of backing pieces are placed along the aforesaid periphery at a given spacing and directed in radial direction. The adapter pieces are embedded in the inner surfaces of the opposing walls of the annular groove in the aforesaid packing body and exposed therefrom for sliding contact with the opposite end portions of each of the backing pieces. As a result, when the packing body is contracted, the opposite end portions of each of the backing pieces will slide on the surfaces of the adjoining two adapter pieces in the circumferential direction.

What is claimed is:

1. A seal for use in the hydraulic testing of a pipe length, said seal comprising an annular resilient body, an annular recess in and around the inner periphery of said body, arcuate backing pieces of hard material mounted in said inner annular recess at locations circumferentially spaced relative to each other, and a plurality of adaptor pieces of hard material embedded in said annular recess and circumferentially spaced relative to each other in such manner as to bridge the spaces between adjacent backing pieces and be slidable on the outer peripheral surfaces thereof.

* * * * *